US010900575B2

(12) United States Patent
McEvoy et al.

(10) Patent No.: US 10,900,575 B2
(45) Date of Patent: Jan. 26, 2021

(54) BALANCED STEM AND SURFACE SAFETY VALVE

(71) Applicant: Baker Hughes Oilfield Operations LLC, Houston, TX (US)

(72) Inventors: Travis Kyle McEvoy, Houston, TX (US); Jeremy Choate, Houston, TX (US); Keith Adams, Katy, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/288,457

(22) Filed: Feb. 28, 2019

(65) Prior Publication Data
US 2020/0278035 A1 Sep. 3, 2020

(51) Int. Cl.
*F16K 3/316* (2006.01)
*F16K 3/02* (2006.01)
*E21B 34/02* (2006.01)

(52) U.S. Cl.
CPC ............ *F16K 3/316* (2013.01); *F16K 3/0227* (2013.01); *F16K 3/0245* (2013.01); *E21B 34/02* (2013.01)

(58) Field of Classification Search
CPC ...... F16K 3/316; F16K 3/0227; F16K 3/0245; E21B 34/02
See application file for complete search history.

(56) References Cited

U.S. PATENT DOCUMENTS

| | | | |
|---|---|---|---|
| 2,541,968 A | 2/1951 | Laurent | |
| 2,728,549 A * | 12/1955 | Smith-Petersen | F16K 3/316 251/196 |
| 2,810,543 A * | 10/1957 | Bryant | F16K 3/316 251/172 |
| 2,816,730 A * | 12/1957 | Rabas | F16K 3/0227 251/328 |
| 2,930,577 A * | 3/1960 | Bredtschneider | F16K 3/316 251/200 |

(Continued)

FOREIGN PATENT DOCUMENTS

GB 669933 4/1952

OTHER PUBLICATIONS

International Search Report and Written Opinion dated May 8, 2019 in corresponding PCT Application No. PCT/US19/19966.

(Continued)

*Primary Examiner* — Matthew W Jellett
*Assistant Examiner* — Christopher D Ballman
(74) *Attorney, Agent, or Firm* — Hogan Lovells US LLP

(57) ABSTRACT

Embodiments of the present disclosure include a system for controlling a fluid flow. The system includes a valve body including a bore extending along an axis, an inlet, and an outlet, wherein a flow passage extends transverse the axis from the inlet to the outlet, a stem extending through the bore along the axis, and a valve member coupled to the stem. The valve member is movable along the axis, via the stem, between a closed position where the valve member blocks the flow passage to an open position where the valve member does not block the flow passage. The system also includes a balancing system coupled to the valve member, the balancing system comprising a tether and a balance member, wherein an opening force unseating the valve member is translated to the balance member.

20 Claims, 6 Drawing Sheets

(56) References Cited

U.S. PATENT DOCUMENTS

| | | | |
|---|---|---|---|
| 2,991,042 A * | 7/1961 | Natho | F16K 31/143 251/14 |
| 3,013,769 A * | 12/1961 | Volpin | F16K 3/316 251/174 |
| 3,026,084 A * | 3/1962 | Bryant | F16K 27/044 251/282 |
| 3,057,595 A * | 10/1962 | McKinney | F16K 3/0227 251/187 |
| 3,314,442 A * | 4/1967 | Volpin | F16K 3/188 137/246.12 |
| 3,372,900 A * | 3/1968 | Grove | F16K 27/105 251/205 |
| 3,533,598 A * | 10/1970 | Tillman | F16K 3/314 251/327 |
| 3,538,948 A * | 11/1970 | Nelson | F16K 37/0041 137/554 |
| 3,768,774 A * | 10/1973 | Baugh | F16K 3/316 251/175 |
| 3,889,925 A * | 6/1975 | Brooks | F16K 3/316 251/327 |
| 3,933,338 A * | 1/1976 | Herd | F16K 31/1225 251/63.6 |
| 3,945,394 A * | 3/1976 | Sullivan | F16K 17/0406 137/430 |
| 4,029,294 A * | 6/1977 | McCaskill | F16K 3/36 251/282 |
| 4,081,174 A * | 3/1978 | Johnson | F16K 3/316 251/327 |
| 4,188,016 A * | 2/1980 | Whaley | F16K 3/16 251/167 |
| 4,230,299 A | 10/1980 | Pierce | |
| 4,281,819 A | 8/1981 | Linder | |
| 4,294,284 A * | 10/1981 | Herd | E21B 34/04 137/236.1 |
| 4,373,700 A * | 2/1983 | Buchta | F16K 41/14 251/214 |
| 4,451,047 A * | 5/1984 | Herd | F16J 15/183 251/214 |
| 4,505,452 A * | 3/1985 | Bragin | F16K 3/314 251/326 |
| 4,531,711 A * | 7/1985 | Bunch | F16J 15/3236 251/214 |
| 4,541,449 A * | 9/1985 | Burke | F16K 3/316 137/72 |
| 4,651,973 A * | 3/1987 | Oliver | F16K 31/508 251/267 |
| 4,771,805 A * | 9/1988 | Maa | F16K 3/0236 137/454.6 |
| 4,809,733 A * | 3/1989 | Hawkins | E21B 34/02 137/236.1 |
| 4,844,407 A * | 7/1989 | Baker | F16K 31/143 251/14 |
| 5,415,378 A * | 5/1995 | Craven | E21B 34/02 251/31 |
| 5,425,410 A | 6/1995 | Reynolds | |
| 5,735,501 A * | 4/1998 | Maurer | F16K 3/0272 251/327 |
| 6,125,874 A * | 10/2000 | Holliday | E21B 33/0355 137/81.2 |
| 6,598,849 B2 * | 7/2003 | Hoang | F16K 3/0254 251/62 |
| 7,231,934 B2 * | 6/2007 | Biester | E21B 33/064 137/68.13 |
| 7,975,983 B2 * | 7/2011 | Comeaux | F16K 3/316 251/193 |
| 8,523,141 B2 * | 9/2013 | Elliott | F16K 47/08 251/127 |
| 9,091,351 B2 * | 7/2015 | DeOcampo | F16K 3/0254 |
| 9,429,239 B2 * | 8/2016 | Jee | F16K 3/182 |
| 10,508,744 B2 * | 12/2019 | Roberts | F16K 3/26 |
| 2012/0291877 A1 * | 11/2012 | Meek | F16K 3/02 137/242 |
| 2017/0102078 A1 * | 4/2017 | DeOcampo | F16K 3/0218 |

OTHER PUBLICATIONS

"FLS-DAN API 6A Double-Acting Actuated Drilling Gate Valve," 2018, Schlumberger, https://www.products.slb.com/valves/brands/cameron/fls-dan-gate-valve, 3 pages.

* cited by examiner

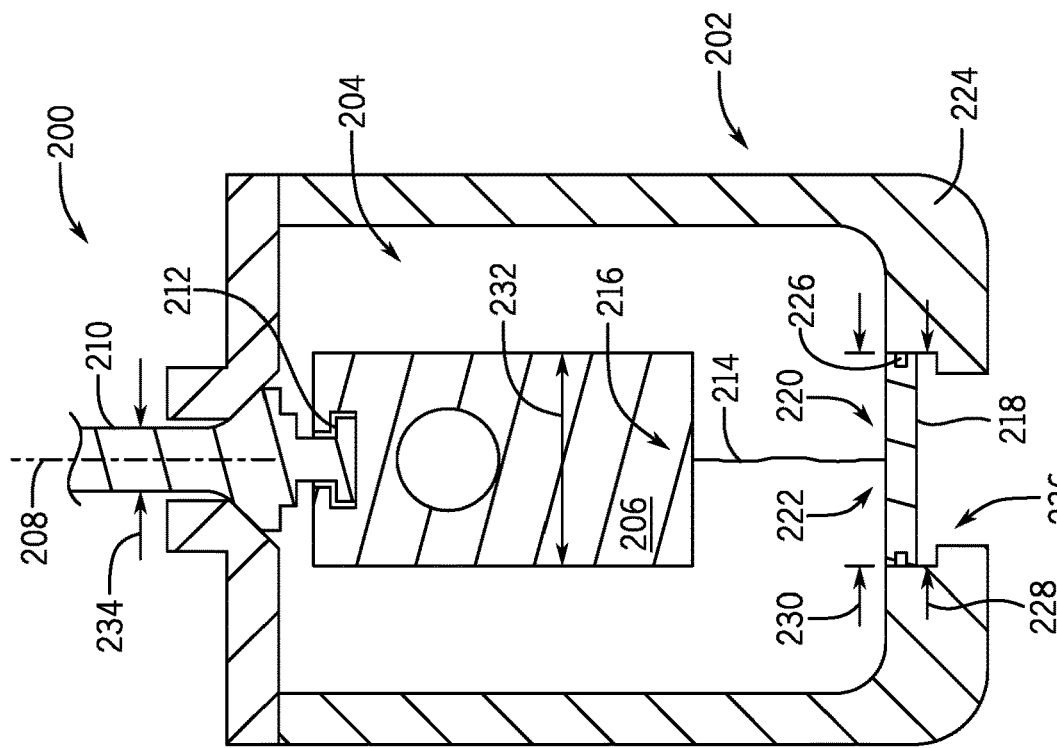
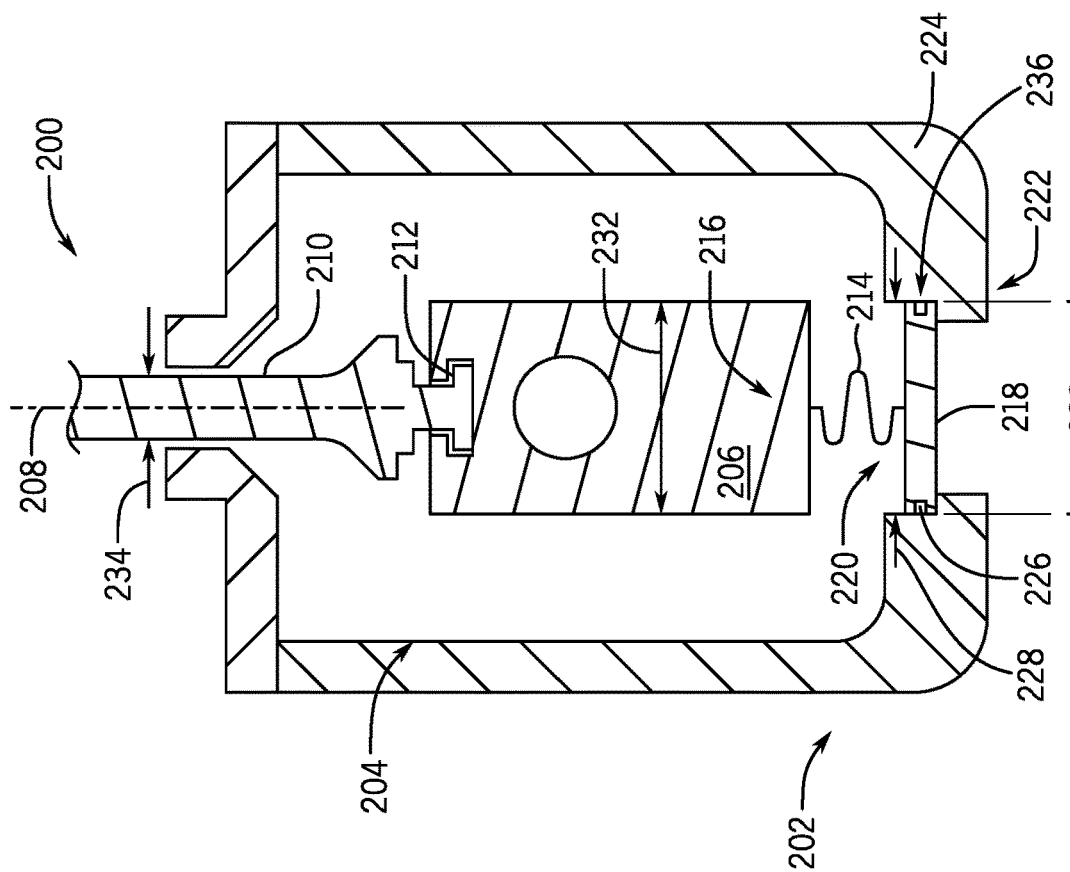

BALANCED STEM AND SURFACE SAFETY VALVE

BACKGROUND

1. Field of the Invention

The present disclosure relates in general to valve systems and more particularly to valve systems having dual operating modes.

2. Description of Related Art

During downhole drilling and recovery operations, various tools may be tripped into and out of a wellbore to perform a number of different tasks. Wellbores may include wellbore assemblies at the surface that include one or more valves to regulate flow into and out of the wellbore. The valves may be exposed to high pressures, which need to be overcome in order to move the valves between an open position and a closed position. When stroking the valve, a valve member, such as a gate, is translated axially through a valve bore. To open the valve from the closed position, both the stem thrust and gate drag impact a total operating force to open the valve. Various valves may include balanced stems to reduce the stem thrust, thus reducing the operating forces. However, balanced stem valves do not operate as surface safety valves that are set to close at a certain pressure. As a result, safety valves used at the well site may include large, expensive actuators to facilitate operation of the valve.

SUMMARY

Applicants recognized the problems noted above herein and conceived and developed embodiments of systems and methods, according to the present disclosure, for valve systems.

In an embodiment a system for controlling a fluid flow includes a valve body including a bore extending along an axis, an inlet, and an outlet, wherein a flow passage extends transverse the axis from the inlet to the outlet, a stem extending through the bore along the axis, and a valve member coupled to the stem. The valve member is movable along the axis, via the stem, between a closed position where the valve member blocks the flow passage to an open position where the valve member does not block the flow passage. The system also includes a balancing system coupled to the valve member, the balancing system comprising a tether and a balance member, wherein an opening force unseating the valve member is translated to the balance member.

In another embodiment a system for controlling a flow of fluid through a flow passage includes a valve body having a bore extending along an axis transverse to the flow passage, a stem extending through the bore, and a valve member coupled to a lower end of the stem. The valve member is moveable between an open position and a closed position. The system also includes a balancing system coupled to the valve member including a flexible tether and a balance member, wherein the flexible tether is coupled to the valve member at a first end and to the balance member at a second end, the balance member being moveable axially along the axis in response to movement of the valve member.

In an embodiment, a system for controlling a flow of fluid through a flow passage including a valve body having a bore extending along an axis transverse to the flow passage, a stem extending through the bore, and a valve member coupled to the stem. The valve member is moveable between an open position where the flow passage is unobstructed and a closed position where the flow passage is obstructed. The system also includes a balancing system coupled to the valve member including a tether and a balance member, wherein the tether is coupled to the valve member at a first end and to the balance member at a second end, the tether axially moveable within a cavity formed in the valve member.

BRIEF DESCRIPTION OF DRAWINGS

The present technology will be better understood on reading the following detailed description of non-limiting embodiments thereof, and on examining the accompanying drawings, in which:

FIGS. 2A and 2B are schematic cross-sectional views of embodiments of a valve having a balancing system, in accordance with embodiments of the present disclosure;

DETAILED DESCRIPTION

Figure 1:
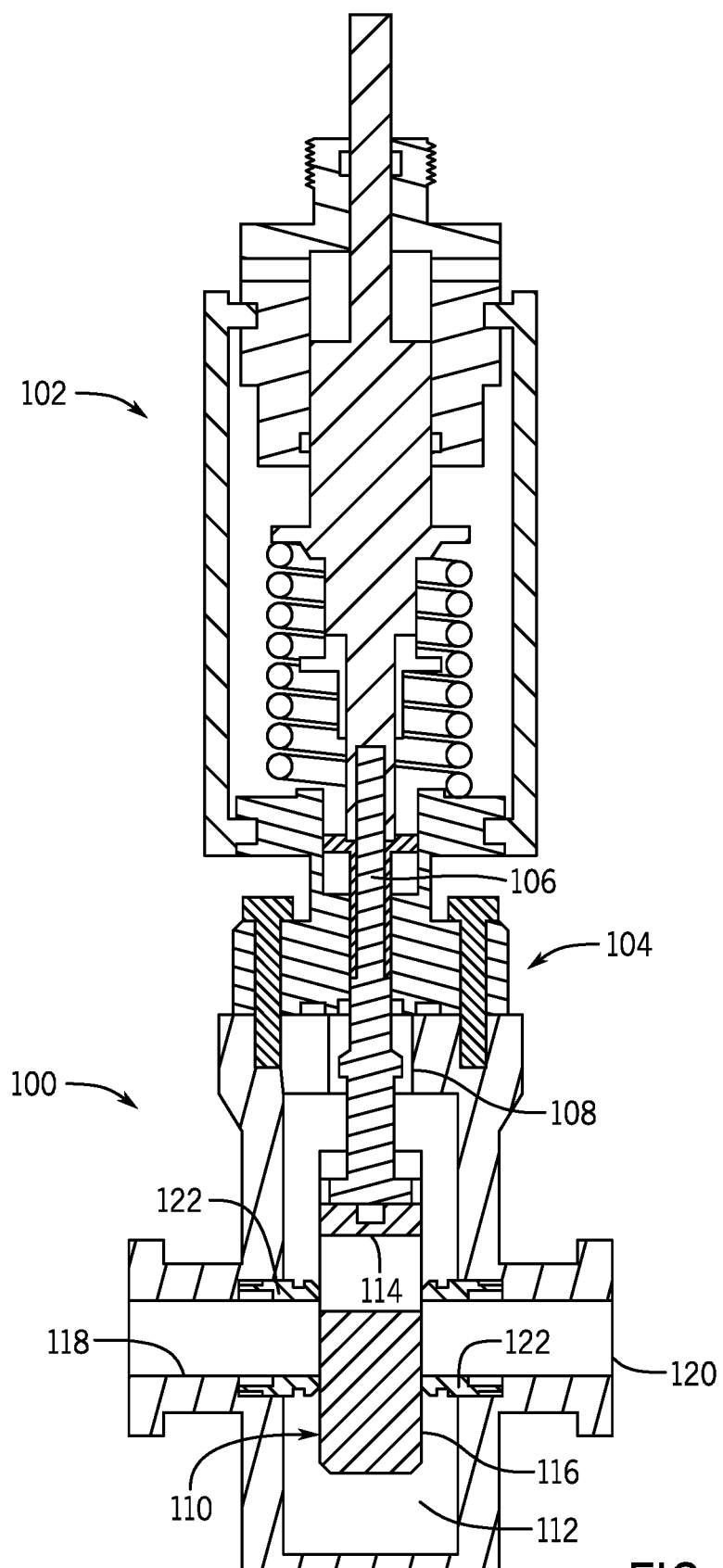
FIG. 1 is a schematic cross-sectional view of an embodiment of a valve having an actuator, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a valve that may be operated as both a balanced stem valve and a surface safety valve. In various embodiments, the valve is configured to be in a balanced stem arrangement when in a closed position and transition to a surface safety valve arrangement when in an open position. As a result, a valve operating force may be reduced because the stem thrust associated with seating and unseating the valve may be reduced or eliminated. In various embodiments, the stem thrust account for approximately one half of the operating force for the valve, therefore, eliminating or reducing the stem thrusts reduces the total operating force for the valve. Moreover, because the valve is arranged to return to an unbalanced stem such that the surface safety valve configuration is utilized during the open position, the valve may be preset to close at a predetermined force, thereby enabling operation of the valve in two different conditions.

In various embodiments, the valve includes a balancing system having a tether and balance member. The tether may extend from a valve member to a balance member. In various embodiments, the tether may be flexible to enable collapse and/or expansion or may be a rigid structure. In various embodiments, the balance member has a diameter that is substantially equal to a stem diameter, thereby forming the balanced stem valve. In certain embodiments, the tether may substantially remove the balance member from operation, for example by having a slack connection or by translating within the valve member. As a result, the balancing system may be positioned to engage and disengage through operation of the valve. In this manner, the valve may be configured to operate in two different modes, which provides the benefits of a balanced stem valve to accompany the operating parameters of a surface safety valve.

FIG. 1 is a cross-sectional side elevation view of an embodiment of a valve 100 that includes an actuator 102 coupled to a bonnet 104. The illustrated actuator 102 is coupled to a valve stem 106 that extends through a central bore 108 and couples to a valve member 110 arranged within a chamber 112. The illustrated valve member 110 includes a passage 114 and a block 116. As shown, fluid (e.g., gas, liquid, solid, or a combination thereof) may enter the valve 100 through an inlet passage 118 and engage the valve member 110 en route to an outlet passage 120. In the illustrated embodiment, the valve member 110 is transitioning between an open position, in which the passage 114 is substantially aligned with the inlet passage 118 and the outlet passage 120, and a closed position, in which the block 116 is substantially aligned with the inlet passage 118 and the outlet passage 120. The illustrated valve member 110 may seal against valve seats 122.

In operation, the actuator 102, which may be manual or automated (e.g., hydraulic, pneumatic, electric, etc.) drives movement of the valve member 110 between the open position and the closed position. When moving the valve member 110 from the closed position to the open position, the actuator overcomes an opposing force present in the valve 100 (e.g., the pressure of the fluid). This opening force may be referred to as a total operational force and includes components of both stem thrust and gate drag. Stem thrust refers to the linear force to seat and unseat the valve member. Gate drag refers to a lateral force applied by the fluid to the valve member. In various embodiments, each component may account for approximately one half of the opening force. Accordingly, reducing the stem thrust may reduce the opening force by approximately one half, thereby enabling smaller actuators and/or manual actuators in place of automated actuators. However, in embodiments, it is also desirable for the valve 100 to be utilized as a safety valve (e.g., surface safety valve) which may be configured to move the valve member 110 to the closed position at a predetermined pressure, for example, a predetermined pressure set by a spring that maintains the valve member 110 in the open position. In various embodiments, such an arrangement is enabled by providing the valve member 110 with a larger diameter than a diameter of the stem 106. When the valve member 110 has a larger diameter than a diameter of the stem 106, the force acting on the valve member 110 will be greater than the force acting on the stem 106, thereby facilitating closure of the valve 200.

Embodiments of the present disclosure include a valve 200 that includes a balancing system 202 that enables the valve 200 to operate as both a balanced stem valve and a surface safety valve. FIGS. 2A and 2B are cross-sectional views of the valve 200 including the balancing system 202. It should be appreciated that various components of the valve 200 have been removed for clarity with the present discussion. As illustrated, the valve 200 includes a chamber 204 where a valve member 206 can move axially along an axis 208 via a valve stem 210. It should be appreciated that while the illustrated valve member 206 is a gate, various other types of valves may be used within the scope of the present discussion. The illustrated valve member 206 is coupled to the stem 210 via a connector 212. The illustrated connector 212 is a T-nut connector, but it should be appreciated that a variety of other connectors such as a lift nut, horseshoe, or the like may be utilized. In operation, a force is applied to the stem 210, for example via an actuator (not pictured) to transition the valve member 206 between an open position (FIG. 2A) and a closed position (FIG. 2B).

In various embodiments, the valve 200 is configured to operate as a balanced stem valve while in the closed position and as a surface safety valve while in the open position due to the balancing system 202. The illustrated balancing systems includes a tether 214 coupled to the valve member 206 at a first end 216 and to a balance member 218 at a second end 220. The balance member 218 is arranged within a recess 222 formed in a valve body 224. In various embodiments, the balance member 218 includes a seal 226, for example, to block debris or liquid from flowing into the recess 222 and blocking axial movement of the balance member 218 along the axis 208. In various embodiments, the recess 222 has a recess diameter 228 that is substantially equal to a member diameter 230. Moreover, in embodiments, the recess 222 includes a lip or threaded reduced diameter ring that regulates axial movement of the balance member 218. For example, the lip may extend over the balance member 218 (e.g., had a diameter smaller than the recess 222 and/or the balance member 218) and block axial movement of the balance member 218 beyond a predetermined position. Furthermore, the threaded reduced diameter ring may also be used to block axial movement of the balance member 218 past a predetermined position.

In the illustrated embodiment, a valve member diameter 232 is larger than a stem diameter 234. As a result, the valve 200 illustrated in FIG. 2A acts as a surface safety valve when in the open position because forces acting on the valve member 206 may be sufficient to overcome opposing forces, for example from the stem 210, to facilitate closure of the valve at a predetermined pressure. As shown, the tether 214 is slack and the balance member 218 rests at a bottom 236 of the recess 222. Accordingly, the balance member 218 does not equalize forces across the valve member 206 and the valve stem 210, as will be described below. In this manner, the valve may act as a surface safety valve when open, such as the valve 200 illustrated in FIG. 2A.

The embodiments illustrated in FIGS. 2A and 2B illustrate the valve 200 at the open position and the closed position, respectively. It should be appreciated that as the valve 200 transitions from the open position to the closed position that the force acting on the tether 214 may not be immediately (e.g. without significant delay) transmitted to the balance member 218. In various embodiments, the tether 214 is formed from a material that has compliance or some stretch such that the balance member 218 may act as a spring-mass damper. That is, the tether 214 may be stretched to a position before force is transferred to the balance member 218. As a result, the functionality of the surface safety valve operating condition shown in FIG. 2A is maintained.

FIG. 2B, in contrast, includes a taut tether 214 and the balance member 218 is not at the bottom 236 of the recess 222, but rather, has moved axially along the axis 208 when the valve 200 is in the illustrated closed position. In various embodiments, the diameter 232 of the valve member 206 is larger than the diameter 234 of the stem 210. However, in various embodiments, the diameter 230 of the balancing member 218 is substantially equal to the diameter 234 of the stem 210. As a result, the valve 200 is a balanced stem valve where stem thrust is reduced and/or eliminated to reduce the operating force of the valve 200. For example, in operation the actuator will drive the stem 210, and therefore the valve member 206, in a downward direction along the axis 208. The initial force is translated along to the balance member 218, which has the diameter 230 equal to the diameter 234 of the stem 210, to balance the force across the valve, thereby reducing the stem thrust for opening the valve 200 and reducing the overall energy to be approximately equal to the gate drag. In other words, the balanced stem reduces the total force to open the valve. It should be appreciated that, in various embodiments, the ratio between the stem diameter 234 and the balance diameter 230 is approximately 1:1. However, different ratios may be used to adjust operating forces. For example, the ratio may be 1:1.5; 1:2, 1:3, 1.5:1, 2:1, 3:1, or any other reasonable ratio. Accordingly, various dimensions of the components may be particularly selected based on expected operating conditions of the valve.

In various embodiments, movement of the valve member 206 from the open position to the closed position may be assisted by external components, such as a spring assist. For example, while the force of the fluid may be sufficient to close the valve 200, for example via the momentum of the valve member 206 moving in the upward direction, additional external features may be utilized as a back-up or assurance of closure of the valve 200. While these systems are not illustrated for clarity, it should be appreciated that the closure-assist system may be arranged at a top or bottom of the valve 200 and may be mechanical, electrical, hydraulic, pneumatic, or the like.

Figure 3A:
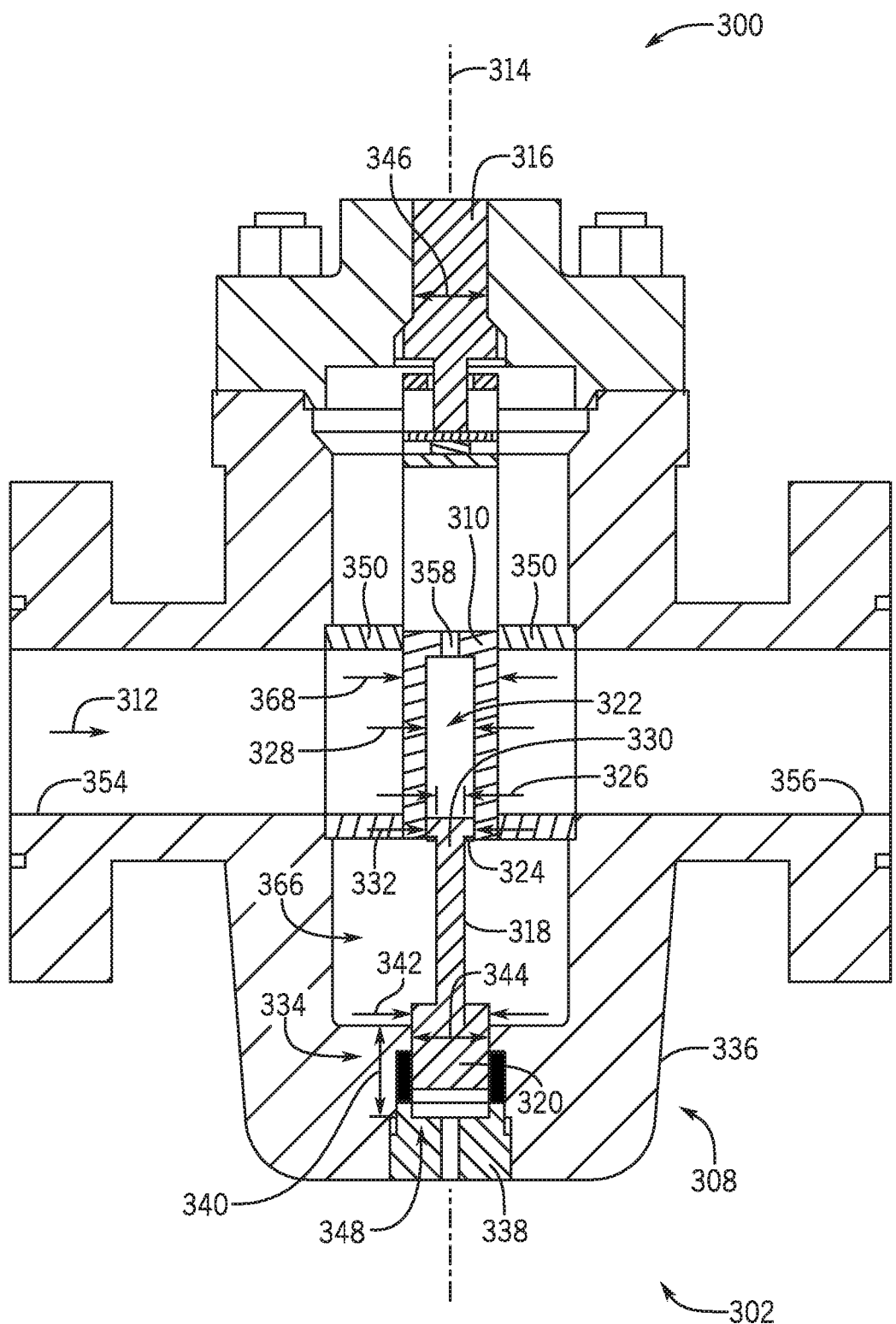
FIGS. 3A-3C are schematic cross-sectional views of embodiments of a valve having a balancing system, in accordance with embodiments of the present disclosure.
Figure 3B:
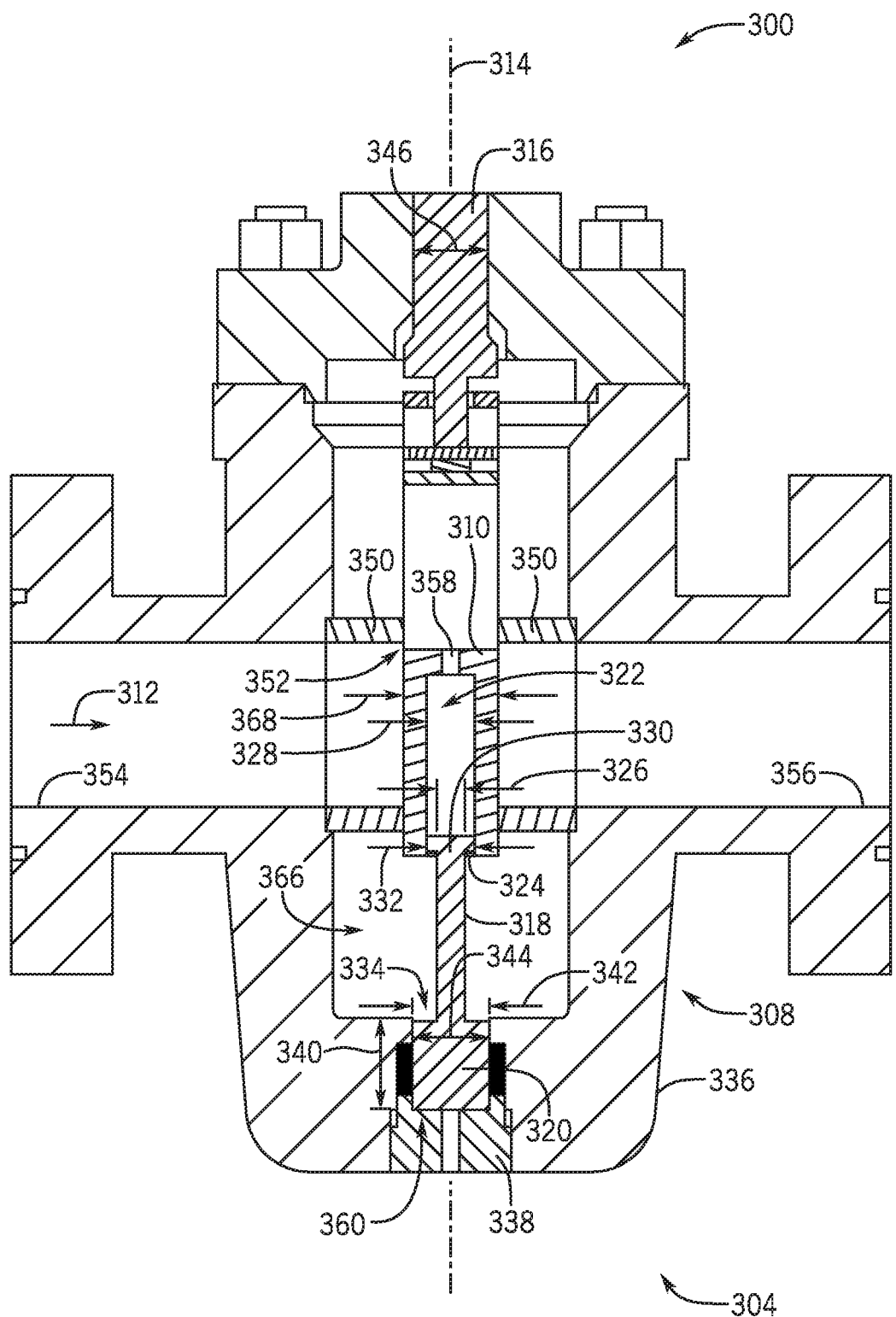
Figure 3C:
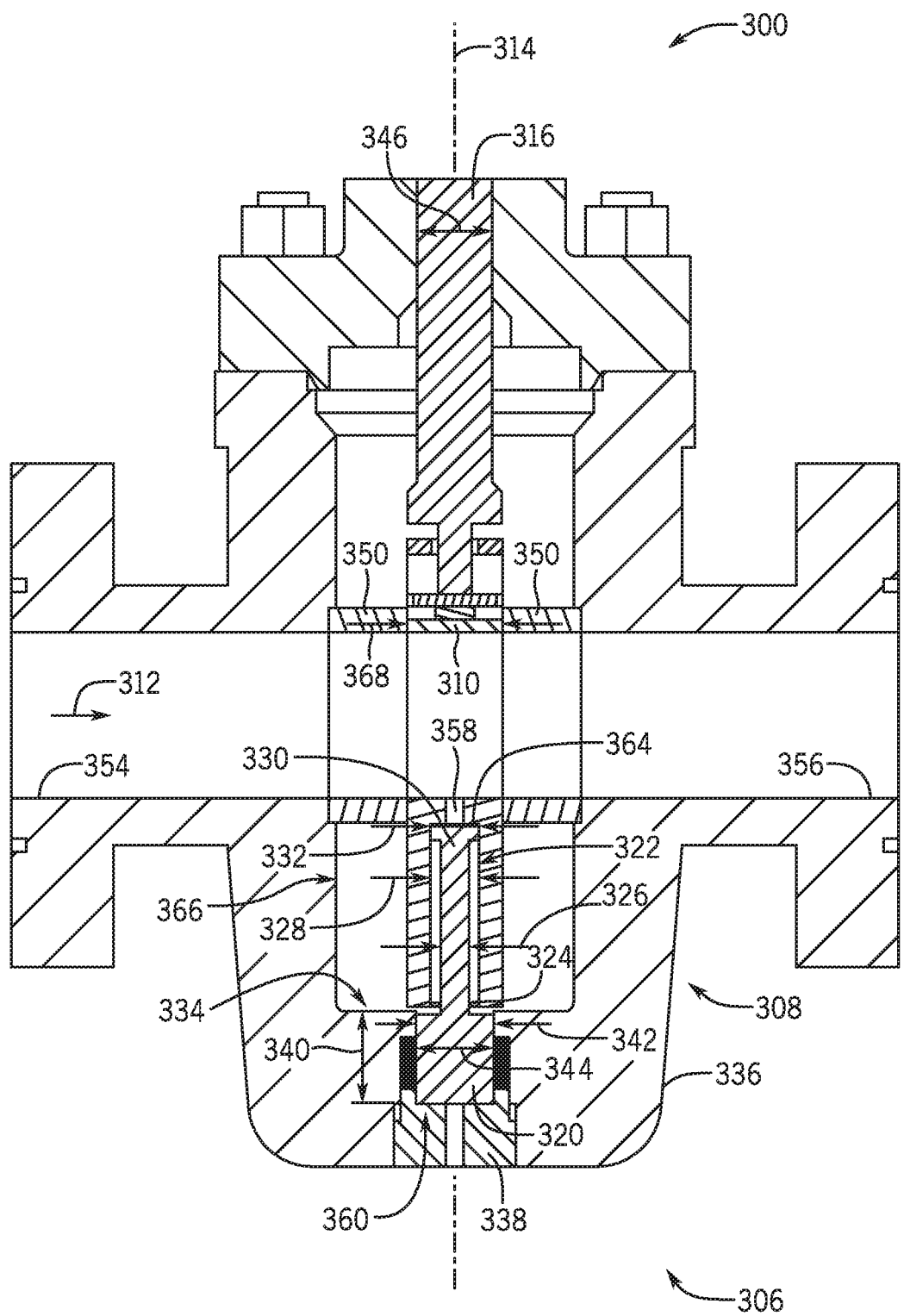

FIGS. 3A-3C are cross-sectional views of embodiments of a valve 300 in a closed position 302, a break open position 304, and an open position 306, respectively. As described above, in various embodiments the valve 300 operates as a surface safety valve when in the open position and as a balanced stem valve when in the closed position. Accordingly, the valve 300 reduces the operating force for moving between the closed position 302 and the open position 306 while also maintaining safety features for closing the valve 300 at a predetermined pressure.

The illustrated valve 300 includes the balancing system 308 that enables the valve 300 to be both a safety valve and a balanced stem valve. The illustrated valve 300 includes a valve member 310 that translates between the open position and the closed position by blocking flow through a flow passage 312 that extends transverse an axis 314. The valve member 310 is coupled to a valve stem 316 that drives movement of the valve member 310 along the axis 314, for example, via an actuator (not pictured). As will be described below, as the valve transitions to the open position illustrated in FIG. 3C, the balancing system 308 reduces the initial force for breaking open the valve 300 and also enables operation as a safety valve.

The balancing system 308 includes a tether 318, in the form of a solid or rigid member, coupled to a balance member 320. The illustrated tether 318 extends into a cavity 322 formed in the valve member 310. In the illustrated embodiment, a fastener 324 couples the tether 318 to the valve member 310. The illustrated fastener 324 is a snap ring, however, it should be appreciated that the fastener 324 may be any device that enables axial movement of the tether 318, as illustrated in FIGS. 3A-3C. For example, in various embodiments, the fastener 324 is a device having a diameter 326 that is less than a cavity diameter 328. Accordingly, the fastener 324 blocks the tether 318 from separating from the cavity 322.

In the illustrated embodiment, the tether 318 includes a head 330 that is arranged within the cavity 322. In the illustrated embodiment, a head diameter 332 is larger than the fastener diameter 326, and as a result, the tether 318 is secured to the valve member 310. As will be described below, the head 330 is configured to translate axially within the cavity 322 as the valve member 310 moves between the open position and the closed position.

The illustrated balance member 320 is arranged within a recess 334 formed within a valve body 336 by a plug 338. Accordingly, in embodiments, changing the plug 338 may modify one or more properties of the recess 334, such as depth 340, diameter 342, and the like. The illustrated balance member 320 has a diameter 344 that is substantially equal to the diameter 342. Moreover, in embodiments, the diameter 344 is substantially equal to a stem diameter 346. As a result, the valve 200 may be utilized as a balanced stem valve. In other words, as described above, the stem thrust utilized to move the valve to the open position from the closed position is substantially equalized over the valve, thereby reducing the total opening energy utilized by the valve. As illustrated, there is a gap 348 between a bottom of the recess 334 and the balance member 320. As will be described, the gap 348 may be eliminated when the valve member 310 is in the open position.

FIG. 3B illustrates the valve in the break open position 304. As illustrated, the valve member 310 is separated from valve seats 350. In other words, a flow path 352 is established from a first end 354 to a second end 356 of the valve 300. In the illustrated embodiment, the balance member 320 is driven in a downward direction into the recess 334 based at least in part on the force of the valve stem 316 and from fluid entering the cavity 322 via a hole 358. As will be illustrated in FIG. 3C, the tether 318 may move axially within the valve member 310 to drive the fluid out of the cavity 322 when the valve member 310 is moved to the open position 306. The embodiment illustrated in FIG. 3B includes a second gap 360, which is smaller than the gap 348. Accordingly, FIG. 3B illustrates downward movement of the balance member 320 as the valve is transitioned toward the open position.

FIG. 3C illustrates the valve in the open position 306. In the illustrated embodiment, the balance member 320 is seated at a bottom 362 of the recess 334. Furthermore, in various embodiments, the head 330 of the tether 318 is arranged proximate a stop end 364 of the cavity. The illustrated stop end 364 is opposite the fastener 324. As illustrated, the tether 318 may move like a piston within the cavity 322 as the valve member 310 is moved between the closed position 302 and the open position 306. As the head 330 moves toward the stop end 364, fluid is driven out of the cavity 322. Furthermore, fluid positioned within a valve chamber 366 may also be directed out of the valve chamber 366 via the cavity 322 and hole 358. However, it should be appreciated that, in various embodiments, other methods for enabling fluid flows, such as flow bys and the like, may also be utilized.

As described above, when the valve 300 is in the closed position 302, the valve 300 may be described as a balanced stem valve. However, in the open position 306 illustrated in FIG. 3C, the valve 300 may operate as a safety valve. For example, a valve member diameter 368 may be larger than the stem diameter 346. Accordingly, in embodiments, the valve member diameter 368 may receive a force from the fluid in the flow passage 312 that drives the stem 316 in an upward direction along the axis 314. The valve 300 may be set at a predetermined pressure such that the valve 300 transitions to the closed position 302 when the fluid pressure in the valve 300 reaches the predetermined pressure. In this manner, the valve 300 may function as a safety valve while having the benefits of the balanced stem valve when the valve 300 is being opened.

Figure 4:
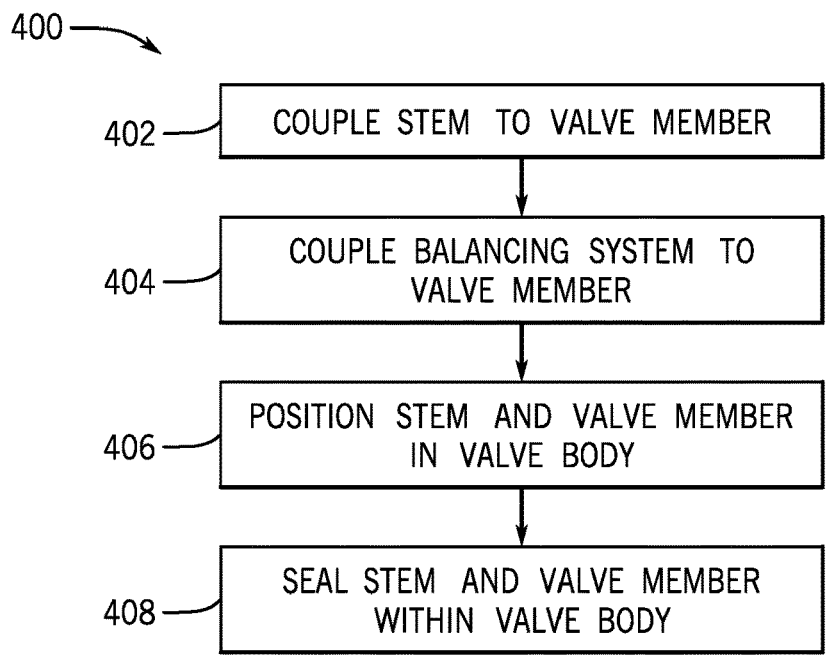
FIG. 4 is a flow chart of an embodiment of a method for forming a valve having a balancing system, in accordance with embodiments of the present disclosure.

FIG. 4 is a flow chart of an embodiment of a method 400 for forming a valve that operates as a balanced stem valve and a safety valve. It should be appreciated that for this method and all methods described herein that the steps may be performed in any order, or in parallel, unless otherwise explicitly stated. Furthermore, there may be more or fewer steps. In this example, a stem is coupled to a valve member (block 402). For example, in various embodiments, the valve stem 210, 316 may be coupled to the valve member 206, 310. It should be appreciated that in various embodiments different coupling mechanisms may be utilized, such as T-nuts, lift nuts, horseshoe connectors, and the like. In various embodiments, a balancing system is coupled to the valve member (block 404). For example, the balancing system 202, 308 may include the tether 214, 318 and the balance member 218, 320. The tether 214, 318 may be rigid or flexible and, in various embodiments, is coupled proximate a bottom end of the valve member 206, 310. The stem and valve member are positioned within a valve body (block 406). In certain embodiments, the stem 210, 316 and valve member 206, 310 are positioned into a chamber 204, 366 within the valve. The stem and valve member are then sealed within the valve body (block 408). For example, a bonnet and various packing systems may be utilized to seal the stem 210, 316 and valve member 206, 310 into the valve for operation.

Figure 5:
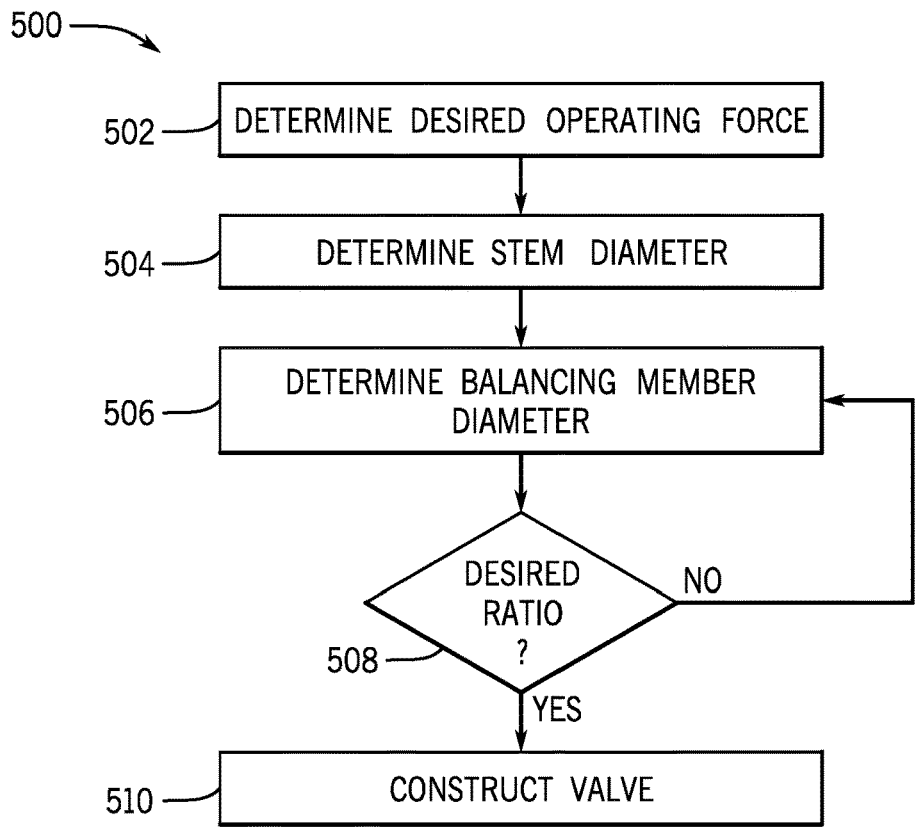
FIG. 5 is a flow chart of an embodiment of a method for determining valve component sizes, in accordance with embodiments of the present disclosure.

FIG. 5 is a flow chart of an embodiment of a method 500 for determining sizes for components of a dual balanced stem and safety valve. In this example, a desired operating force is determined (block 502). For example, the desired operating force may correspond to an output force of one or more actuators. As described above, the actuators may be manual, electric, pneumatic, hydraulic, or the like. A stem diameter may be determined (block 504). In various embodiments, the stem diameter 234, 346 may be determined for one or more valves expected to be in the system. For example, the stem diameters 234, 346 may be associated with valves having a particular size or pressure rating. The balancing member diameter may be determined (block 506). As described above, the balancing member 218, 320 may form a portion of a balancing system 202, 308 utilized to enable operation of a valve as a balanced stem valve and a safety valve. In certain embodiments, the balancing member diameter 230, 344 is approximately equal to the stem diameter 234, 346. That is, there may be a 1:1 correlation between the stem diameter 234, 346 and the balancing member diameter 230, 344. However, as described above, in various embodiments different ratios between the stems may be utilized to adjust the operating force of the valve. A ratio may be evaluated between the stem diameter 234, 346 and the balancing member diameter 230, 344 to determine whether the ratio enables the desired operating force (operator 508). For example, for a fully balanced stem the ratio may be 1:1. However, other ratios may also be desirable based on various operating conditions at the well site. If the ratio does not enable the desired operating force, then the balance member diameter is reevaluated. If the ratio does enable the desired operating force, the valve is constructed (block 510). In this manner, the valve may be sized and constructed.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for controlling a fluid flow, comprising:
a valve body including a bore extending along an axis, an inlet, and an outlet, wherein a flow passage extends transverse the axis from the inlet to the outlet;
a stem extending through the bore along the axis;
a valve member coupled to the stem, the valve member being movable along the axis, via the stem, between a closed position where the valve member blocks the flow passage to an open position where the valve member does not block the flow passage; and
a balancing system coupled to the valve member, the balancing system comprising a tether and a balance member, wherein an opening force unseating the valve member is translated to the balance member, the balance member confined within a common chamber with the valve member.

2. The system of claim 1, further comprising:
a recess formed in the valve body, the recess receiving the balance member, and wherein the balance member axially translates within the recess along the axis.

3. The system of claim 1, further comprising:
a cavity formed in the valve member, wherein at least a portion of the tether axially translates within the cavity as the valve member moves between the open position and the closed position.

4. The system of claim 3, wherein the valve member includes a hole fluidly coupled to the cavity, the hole enabling fluid to flow into the cavity and out of the cavity.

5. The system of claim 3, wherein the tether is substantially rigid and integrally coupled to the balance member.

6. The system of claim 1, wherein the tether is a flexible material that is in a slack position when the valve member is in the open position and a taut position when the valve member is in the closed position.

7. The system of claim 1, wherein a stem diameter is substantially equal to a balance member diameter.

8. The system of claim 1, wherein the balancing system is energized during a portion of a valve stroke.

9. A system for controlling a flow of fluid through a flow passage, comprising:

a valve body having a bore extending along an axis transverse to the flow passage;

a stem extending through the bore;

a valve member coupled to a lower end of the stem, the valve member being moveable between an open position and a closed position; and a balancing system coupled to the valve member including a flexible tether and a balance member, wherein the flexible tether is coupled to the valve member at a first end and to the balance member at a second end and moves between a slack configuration and a taut configuration, the balance member being moveable axially along the axis in response to movement of the valve member.

10. The system of claim 9, wherein the tether is taut when the valve member is in the closed position and slack when the valve member is in the open position.

11. The system of claim 9, wherein a diameter of the balance member is substantially equal to a diameter of the stem, the balance member receiving a force applied by the stem, when the valve member is in the closed position, to balance forces across the stem.

12. The system of claim 9, further comprising:

a recess formed in the valve body, the balance member being positioned in the recess such that a gap is formed between a bottom of the recess and the balance member when the valve member is in the closed position and the balance member contacts the bottom of the recess when the balance member is in the open position.

13. The system of claim 9, wherein a valve member diameter is larger than both a stem diameter and a balance member diameter.

14. The system of claim 9, further comprising:

an external closing mechanism, the external closing mechanism driving the valve stem to the closed position upon activation by a pressure within the flow passage.

15. A system for controlling a flow of fluid through a flow passage, comprising:

a valve body having a bore extending along an axis transverse to the flow passage;

a stem extending through the bore;

a valve member coupled to the stem, the valve member being moveable between an open position where the flow passage is unobstructed and a closed position where the flow passage is obstructed; and a balancing system coupled to the valve member and confined within a common chamber with the valve member, the balancing system including a tether and a balance member, wherein the tether is coupled to the valve member at a first end and to the balance member at a second end, the tether axially moveable within a cavity formed in the valve member.

16. The system of claim 15, wherein a stem diameter is substantially equal to a balance member diameter, and wherein a force applied to the stem when the valve member is in the closed position is equalized by the balance member to reduce an opening force of the valve member.

17. The system of claim 15, further comprising:

a hole in the valve member forming a flow path between the cavity and the bore, wherein fluid collected within the cavity is driven into the flow passage as the valve member moves to the open position.

18. The system of claim 15, further comprising:

a recess formed in the valve body that receives at least a portion of the balance member, wherein the balance member is axially moveable within the recess in response to movement of the valve member.

19. The system of claim 15, wherein the tether is substantially rigid and includes a head that maintains a constant distance from the balance member.

20. The system of claim 15, wherein the valve member is in a balanced stem operation mode when the valve member is in the closed position and in a safety mode when the valve member is in the open position.

* * * * *